United States Patent [19]
Cheng-Chung

[11] Patent Number: 5,380,101
[45] Date of Patent: Jan. 10, 1995

[54] ROTARY TRANSMISSION MECHANISM

[76] Inventor: Chai Cheng-Chung, No. 6, Lane 301, Sec. 2, Honan Rd., Taichung,

[21] Appl. No.: 738

[22] Filed: Jan. 5, 1993

[51] Int. Cl.6 ............................................. F16C 32/06
[52] U.S. Cl. ...................... 384/100; 384/107
[58] Field of Search ............... 384/100, 107, 113, 114; 409/231

[56] References Cited

U.S. PATENT DOCUMENTS

| | | | |
|---|---|---|---|
| 4,682,920 | 7/1987 | Rodgers | 384/107 |
| 5,073,037 | 12/1991 | Fujikawa et al. | 384/107 X |
| 5,078,558 | 1/1992 | Arai et al. | 384/107 X |

Primary Examiner—Thomas R. Hannon
Attorney, Agent, or Firm—Morton J. Rosenberg; David I. Klein

[57] ABSTRACT

A rotary transmission mechanism is disclosed for use with an air/hydraulic cylinder or chuck, consisted of a cylindrical mount, an intermediate ring inserted in the cylindrical mount, a stepped inner socket inserted into the intermediate ring, a flow guide inserted in the stepped inner socket, a rear packing member covered on the flow guide, a front packing member connected to the rear packing member, a slide ring retained between the front and rear packing members, and a spindle fastened to the slide ring through a screw joint and inserted through all the aforesaid parts, wherein compressing a flow of compressed air through either of two inlet holes on the cylindrical mount causes the spindle to be moved forwards or backwards by the slide ring, and simultaneously causes the spindle, the flow guide, the stepped inner socket, and the rear and front packing members to be floated concentrically without producing any friction resistance.

1 Claim, 10 Drawing Sheets

2

ROTARY TRANSMISSION MECHANISM

BACKGROUND OF THE INVENTION

The present invention relates to a rotary transmission mechanism for use with an air/hydraulic chuck or cylinder which eliminates friction loss, greatly increases transmission efficiency, and minimizes installation space.

A bearing is commonly used to support a rotary member to a fixed member so that the rotary member can be rotated concentrically on the fixed member without causing much transmission loss. However, the revolving speed of the rotary member must be maintained within a limited range to prevent the occurrence of overheat, which may cause the rotary member to deform.

FIG. 1 illustrates a rotary transmission mechanism for use with an air/hydraulic cylinder which comprises two thinner bearings 130 to support a cylindrical rotary member 14, and an idle shaft 15 inserted in the cylindrical rotary transmission device 14. As a flow of compressed air (hydraulic fluid) P is continuously compressed into inlet connectors 16, 17, it immediately flows through passage ways 18, 19 to force a cylinder in holding down a chuck or releasing it. At the same time, part of the compressed air fills up the gap 157 between the cylindrical rotary member 14 and the idle shaft 15 to reduce the friction between the bearings 130 and the rotary member 14. This mechanism requires high precision, i.e., the roundness of the rotary member 14 and the idle shaft 15 and the concentricity therebetween are critical (tolerance below 0.005 mm is demanded), and the materials to be used should be of low coefficient of thermal expansion. Therefore, this structure of rotary transmission mechanism is expensive to manufacture, and the manufacturing cost of this structure of rotary transmission mechanism is directly proportional to its capacity. Because bearings are used, the revolving speed of the mechanism is limited. Further, before shifting the idle shaft 14 forwards or backwards, the rotary motion of the idle shaft 14 must be stopped by a brake or like means. Stopping the rotary motion of the 20 idle shaft 14 during the operation of the rotary transmission mechanism consumes additional power and causes a friction loss.

SUMMARY OF THE INVENTION

The present invention has been accomplished under the aforesaid circumstances. It is therefore an object of the present invention to provide a rotary transmission mechanism which eliminates friction loss and improves transmission efficiency. It is another object of the present invention to provide a rotary transmission mechanism which is inexpensive to manufacture and durable in use. It is still another object of the present invention to provide a rotary transmission mechanism which can be made in size according to the tool to be driven without affecting its working efficiency. According to the present invention, a rotary transmission mechanism is generally comprised of a cylindrical mount, an intermediate ring inserted in the cylindrical mount, a stepped inner socket inserted into the intermediate ring, a flow guide inserted in the stepped inner socket, a rear packing member covered on the flow guide, a front packing member connected to the rear packing member, a slide ring retained between the front and rear packing members, and a spindle fastened to the slide ring through a screw joint and inserted through all the aforesaid parts. Compressing a flow of compressed air through either of two inlet holes on the cylindrical mount causes the spindle to be moved forwards or backwards by the slide ring, and simultaneously causes the spindle, the flow guide, the stepped inner socket, and the rear and front packing members to be floated concentrically without producing any friction resistance.

DETAILED DESCRIPTION OF THE PREFERRED EMBODIMENT

Figure 1A:
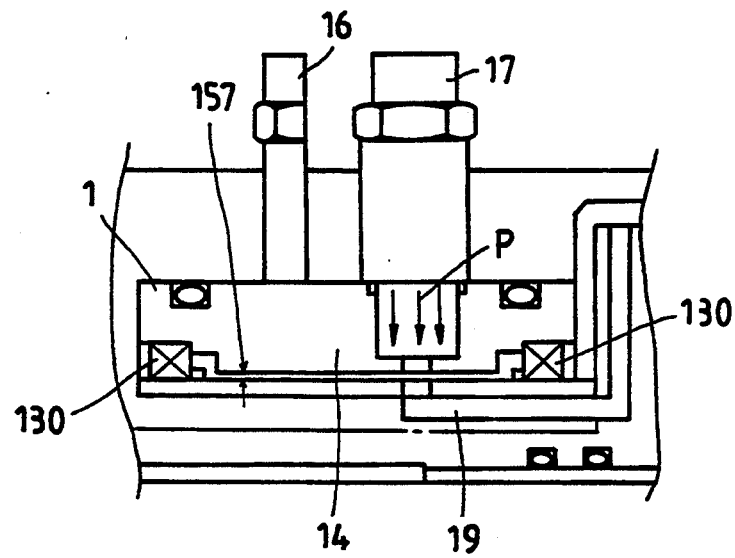
FIGS. 1, 1A shows a rotary transmission mechanism according to the prior art.
Figure 1:
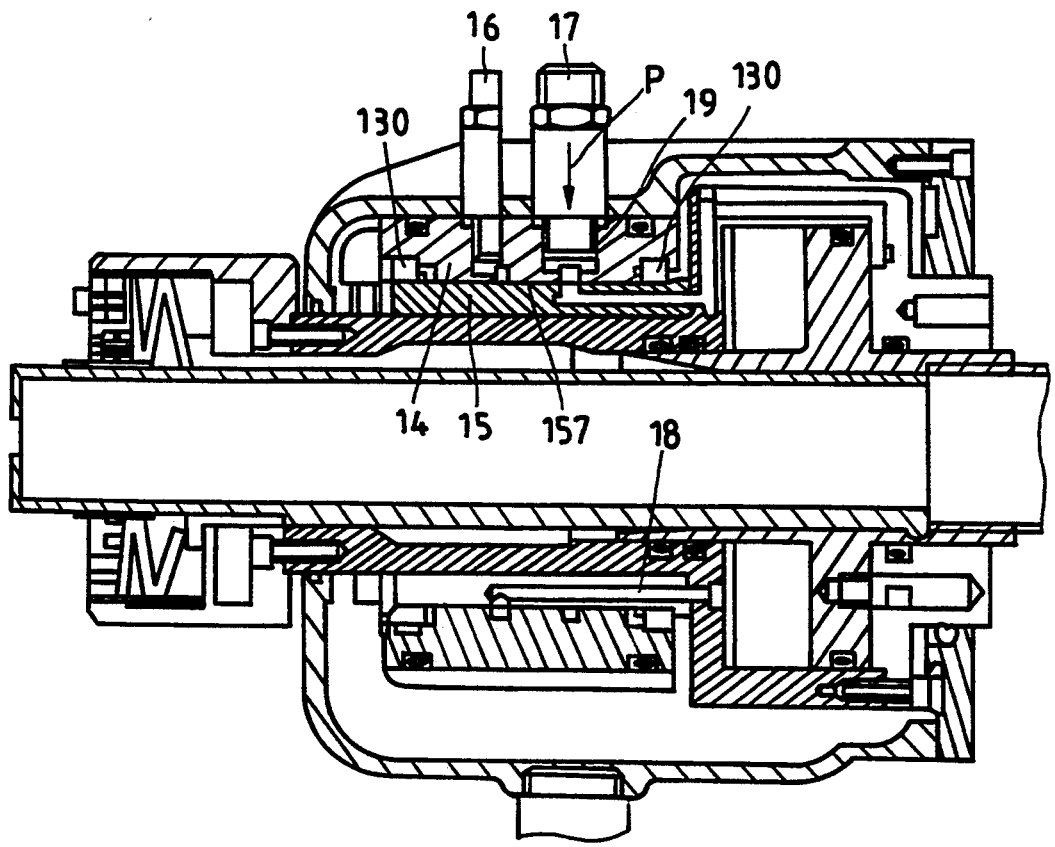
Figure 2:
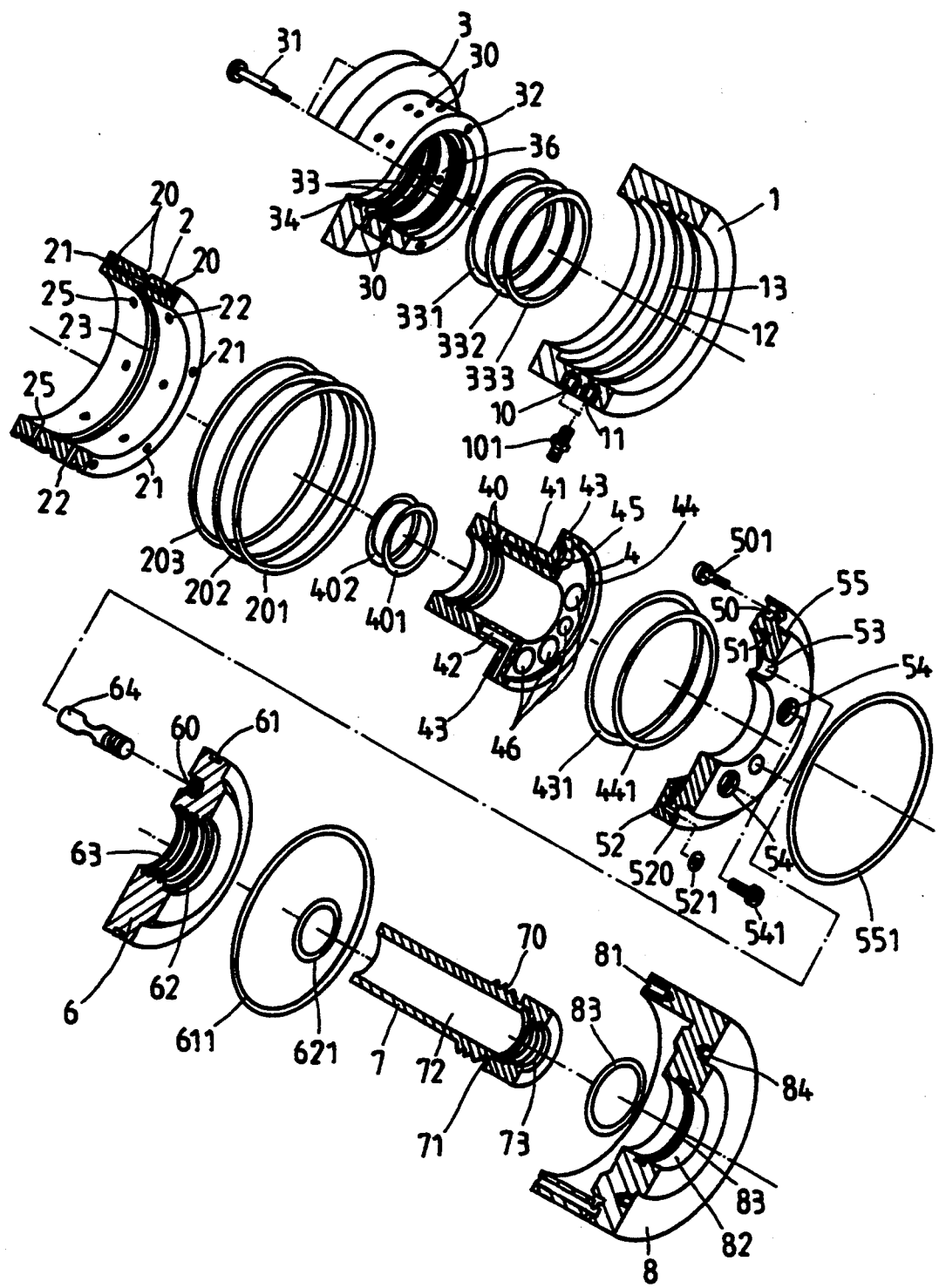
FIG. 2 is an exploded view of a rotary transmission mechanism according to the present invention.

Referring to FIG. 2, an embodiment of the present invention is shown comprised of a cylindrical mount 1, an intermediate ring 2, a stepped inner socket 3, a flow guide 4, a rear packing member 5, a slide ring 6, a spindle 7, and a front packing member 8.

The cylindrical mount 1 comprises two inside annular grooves 12,13 spaced around the inside wall, two air holes 10, 11 through the inside annular grooves 12, 13, two connectors 101 respectively fitted into the air holes 10, 11.

The intermediate ring 2 comprises three outside annular grooves 20 spaced around the outside wall, two series of guide holes 22, 25 equiangularly and radially spaced between either two adjacent outside annular grooves 20, an inside annular groove 23 around the inside wall, and an even number of equiangularly spaced, longitudinal through holes 21 intersected with the inside annular flow guide groove 23, wherein the number of each series of flow guide holes 22 is seven.

The stepped inner socket 3 comprises two symmetrical series of inlet holes 30 in radial direction, a plurality of equiangularly spaced, longitudinal pin holes 32, into which a screw bolt 31 each is respectively inserted, three inside annular grooves 33 around the inside wall, two annular flow guide grooves 34, 36 respectively disposed between either two inside annular grooves 33 and communicated with either series of inlet holes 30, wherein the number of each series of inlet holes 30 is twelve.

The flow guide 4 is made from a headed tube comprising two inside annular grooves 40 around the inside wall adjacent to its plain rear end, two opposite flow guide holes 41, 42 through its head, two outside annular grooves 43, 43 on its head, and a plurality of screw holes 45, 46 spaced through its head in longitudinal direction.

The rear packing member 5 comprises a plurality of screw holes 50 equiangularly spaced in longitudinal direction around the border, an annular flow guide groove 51 on the inside, a flow guide hole 52 extended from the annular flow guide groove 51 to the outside at a location corresponding to one flow guide hole 42 of the flow guide 4, pin holes 53 and screw holes 54 longitudinally aligned with the pin holes 45 and screw holes 46 on the flow guide 4, and an outside annular groove 55 around the periphery.

The slide ring 6 comprises a plurality of screw holes 60 equiangularly spaced on one side, into which a guide screw 64 each is respectively threaded, an outside annular groove 61 around the periphery, and a center through hole 62 with an inner thread 63.

The spindle 7 comprises an outer thread 79 and a contiguous outside annular groove 71 around the outside wall at suitable locations, a center through hole 72 through its length, and an inner thread 73 on the center through hole 72 at one end.

The front packing member 8 is made in the shape of a cap, comprising a flow guide hole 80 and screw holes 81 on one end, a center through hole 82, and an inside annular groove 83 on the center through hole 82, and a plurality of screw holes 84 on an opposite end.

Figure 3:
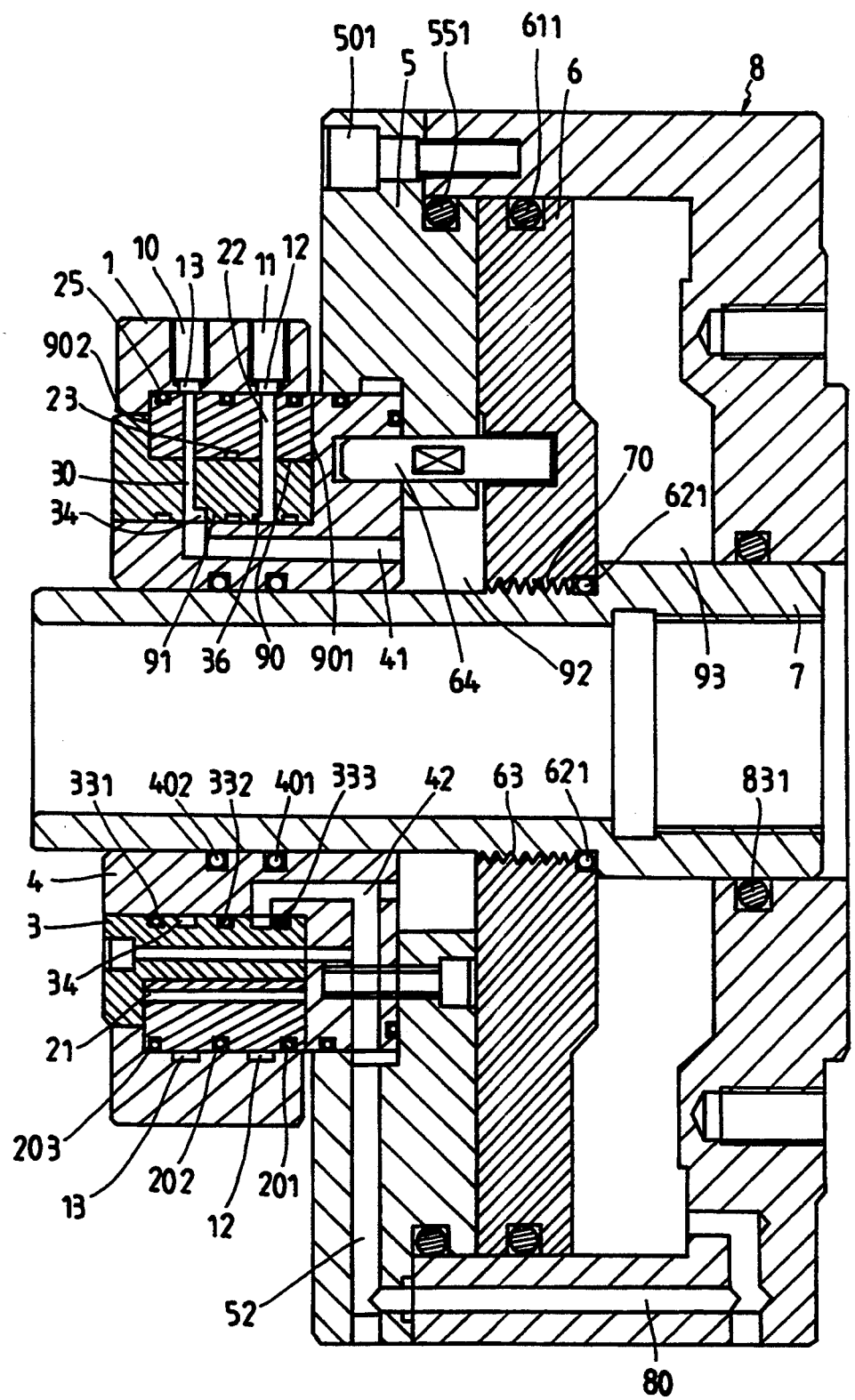
FIG. 3 is a sectional plain of the rotary transmission mechanism of FIG. 2.

Referring to FIG. 3 and FIG. 2 again, seal rings 201,202,203 are respectively mounted on the outside annular grooves 20 of the intermediate ring 2, the cylindrical mount 1 is then mounted on the intermediate ring 2 with the inlet holes 10, 11 and the guide holes 20, 25 respectively aligned, then seal rings 331, 332, 333 are respectively mounted on the inside annular grooves 33 of the stepped inner socket 3 and then the stepped inner socket 3 is inserted into the cylindrical mount 1 and the intermediate ring 2 with the inlet holes 30 respectively aligned with the guide holes 22, 25, then the flow guide 4 is inserted in the stepped inner socket 3 and fastened thereto by inserting screw bolts 31 through pin holes 32 on the stepped inner socket 3 and threading them into screw holes 46 on the flow guide 4, then the rear packing member 5 is fastened to the flow guide 4 by threading screw bolts 541 through screw holes 54 on the rear packing member 5 into screw holes 45 on the flow guide 4, and at the same time seal rings 431, 441 are respectively mounted on the outside annular grooves 43, 44, then a seal ring 621 is mounted on the outside annular groove 71 on the spindle 7 and the outer thread 70 of the spindle 7 is then threaded into the inner thread 63 of the slide ring 6, then a seal ring 831 is mounted on the inside annular groove 83 of the front packing member 8 and then the front packing member 8 is fastened to the rear packing member 5 by threading screw 501 through the screw holes 50 on the rear packing member 5 into the respective screw holes 81 on the front packing member 8. When assembled, spaces 92, 93 are defined inside inside the front and rear packing members 8, 5 for the movement of the slide ring 6 is shifting the spindle 7.

When assembled, the rotary transmission mechanism of the present invention is, then coupled to a power unit for driving a tool. As the power unit, which can be a compressor, air cylinder, hydraulic cylinder etc., is not within the scope of the present invention, its detailed structure is not described further.

Figure 4C:
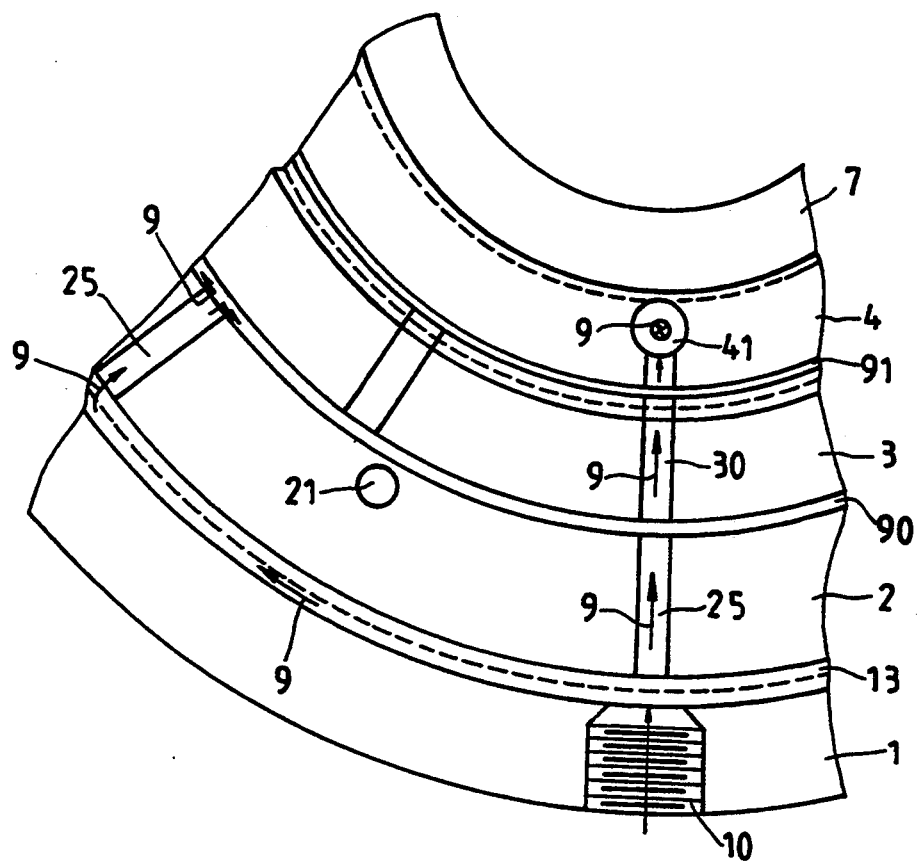
FIG. 4C is a partially cut-away elevational view of the rotary transmission mechanism showing the fluid flow path.
Figure 4:
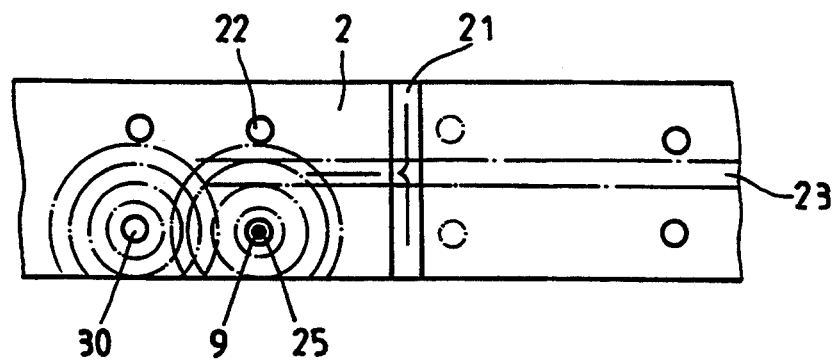
FIG. 4 is a plan view showing the relative positions of the parts of the rotary transmission mechanism during operation.
Figure 4A:
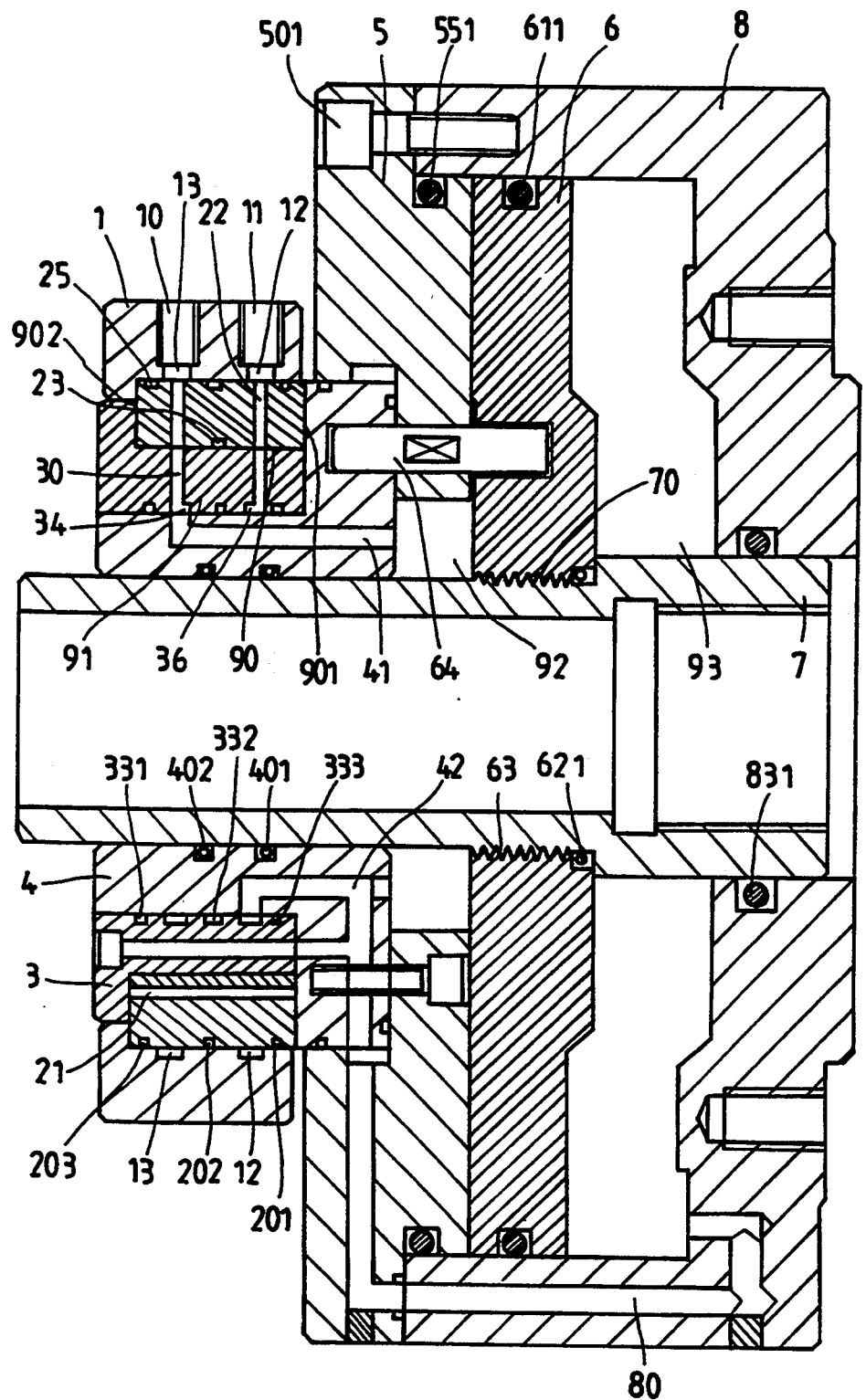
FIG. 4A and 4B are sectional views showing the action of the slide ring of this invention.
Figure 4B:
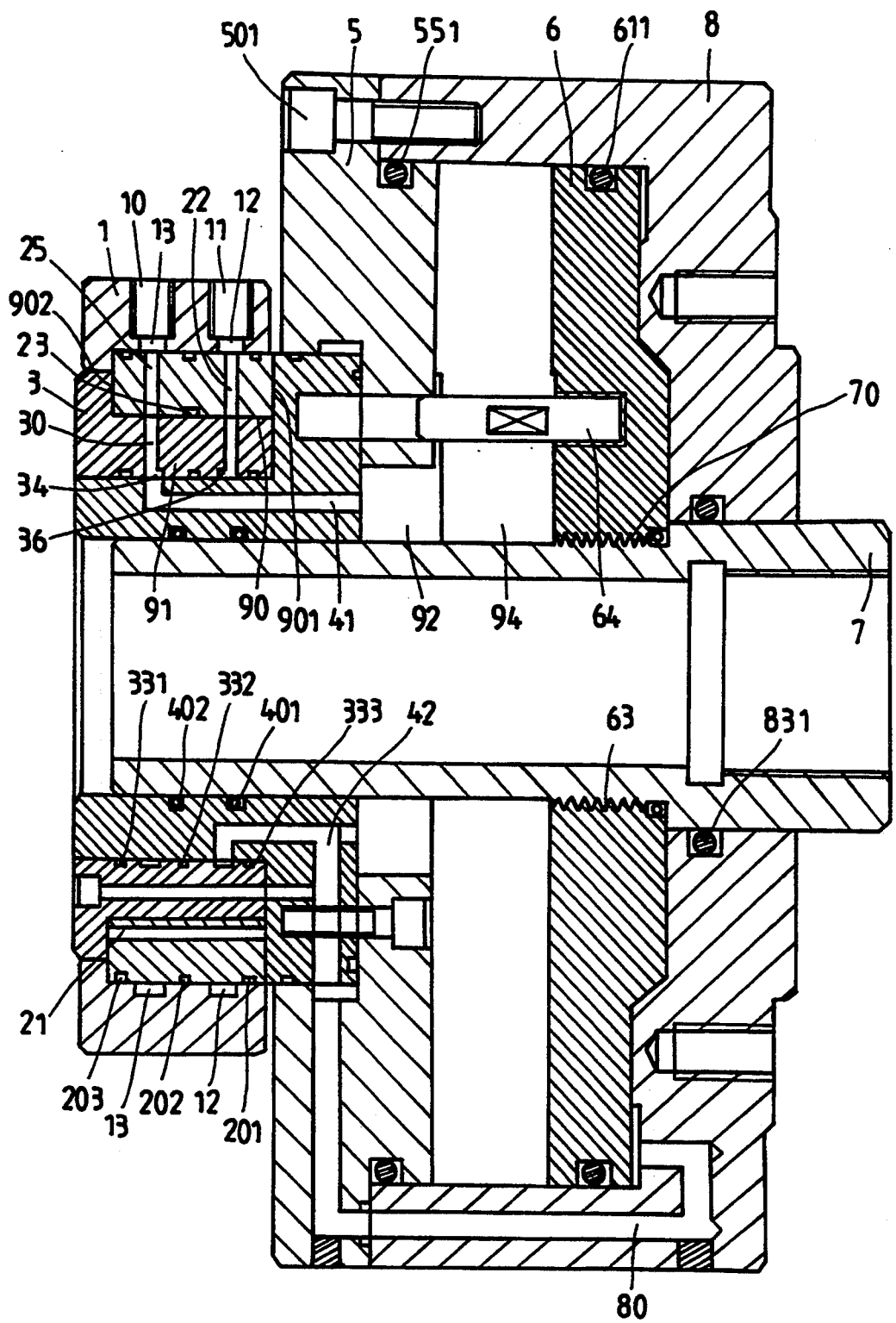

The operation of the present invention outlined hereinafter with reference to FIGS. 4, 4A and 4B. A continuous flow of compressed air 9 is being compressed through one air hole 10 of the cylindrical mount 1 into the corresponding inside annular groove 12 and forced to flow through the guide holes 25 on the intermediate ring 2 and the corresponding inlet holes 30 on the stepped inner socket 3 and simultaneously to flow through the space 90 between the intermediate ring 2 and the stepped inner socket 3 (see FIG. 4B). At the same time, part of the compressed air 9 flows through the longitudinal through holes 21 on the intermediate ring 2 via the inside annular groove 23 thereof, then flows through spaces 901, 902 to uniformly expand the stepped inner socket 3, and therefore the stepped inner socket 3 is concentrically supported within the intermediate ring 2. At the same time, part of the compressed air 9 is guided by the annular flow guide groove 34 into the space 92 via the flow guide hole 41 to further move the slide ring 6 forwards. As the pressure in the space 92 and the pressure of the compressed air 9 are equilibrated, spaces 91, 94 are expanded, therefore the stepped inner socket 3, the flow guide 4 and the spindle 7 are concentrically floated by high pressure. Because of the arrangement of the seal rings 202, 203, floating the stepped inner socket 3, the flow guide 4 and the spindle 7 simultaneously causes floating of the rear packing member 5 and the front packing member 8. Therefore, the members of the transmission mechanism bear the same pressure and concentrically spaced from one another without producing any friction resistance as the transmission mechanism is being rotated to drive a tool. If the compressed air 9 is stopped from entering the air hole 10 and then guided into the other air hole 11 of the cylindrical mount 1, it flows then in the course through the corresponding inside annular groove 13 on the cylindrical mount 1, the corresponding flow guide holes 22 on the intermediate ring 2, the corresponding inlet holes 30 on the stepped inner socket 3, the corresponding annular flow guide groove 42 on the flow guide 4 and the flow guide hole 52 on the rear packing member 5 into the space 93 to move the slide ring 6 backwards, and at the same time, part of the compressed air 9 is guided into the spaces 90, 901, 902 and the space 94, to float the spindle 7, the flow guide 4, the stepped inner socket 3, and the rear and front packing members 5, 8 concentrically. As seen in FIG. 2, O-ring 521 is inserted into opening 520 of the flow guide hole 52 in order to prevent leakage.

Referring FIGS. 2, 3 and 4 again, the seven flow guide holes 22 of the same series on the intermediate ring 2 are spaced from one another at angle 51.4285714″, and the twelve inlet holes 30 of the same series on the stepped inner socket 3 are spaced from one another at angle 30°. As a flow of compressed air 9 is being compressed through the inlet hole 10 into the corresponding inside annular groove 12, the stepped inner socket 3 is so rotated that the corresponding guide holes 22 and inlet holes 30 coincide several times per second (angle difference is about 4.28571° between the first and second coincidences), and therefore the flow of compressed air 9 is continuously guided into spaces 90, 901, 902, 91, 94 and 92. By means of the arrangement of the seal rings 331, 332, 333, 201, 202, 203, 431, 441, 401, 402, 551, 611, 621, 831, leakage loss is minimized to one fourth below when compared to the prior art transmission mechanism. Therefore, the air being compressed into the transmission mechanism provides sufficient pressure to float the spindle 7, the flow guide 4, the stepped inner socket 3, and the rear and front packing members 5, 8 concentrically. Because no friction resistance occurs during the operation of the transmission mechanism, power transmission loss is eliminated. Further, as the flow of compressed air 9 is being switched from one inlet hole 10 or 11 to the other 11 or 10, there is an interval of about 1-2 seconds without having the supply of compressed air. However, because the spaces 90, 901, 902, 91, 94, 92, 93 are fully occupied by compressed air and there is little air leakage loss, the spindle 7, the flow guide 4, the stepped inner socket 3, and the rear and front packing members 5, 8 are still maintained constantly in the concentric state during the aforesaid interval, and therefore, no friction loss happens.

Figure 5:
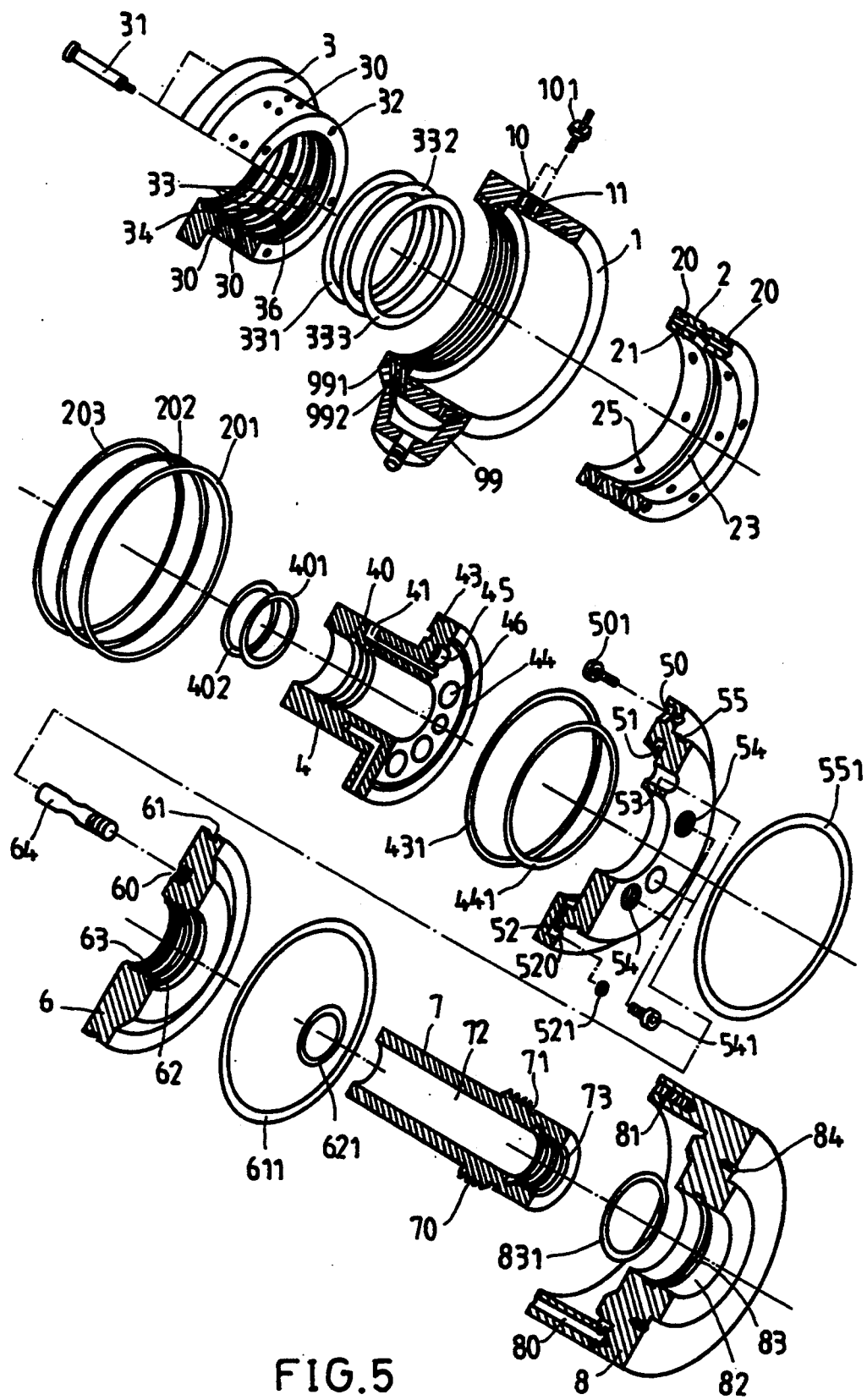
FIG. 5 is an exploded view of an alternate form of the present invention.
Figure 6A:
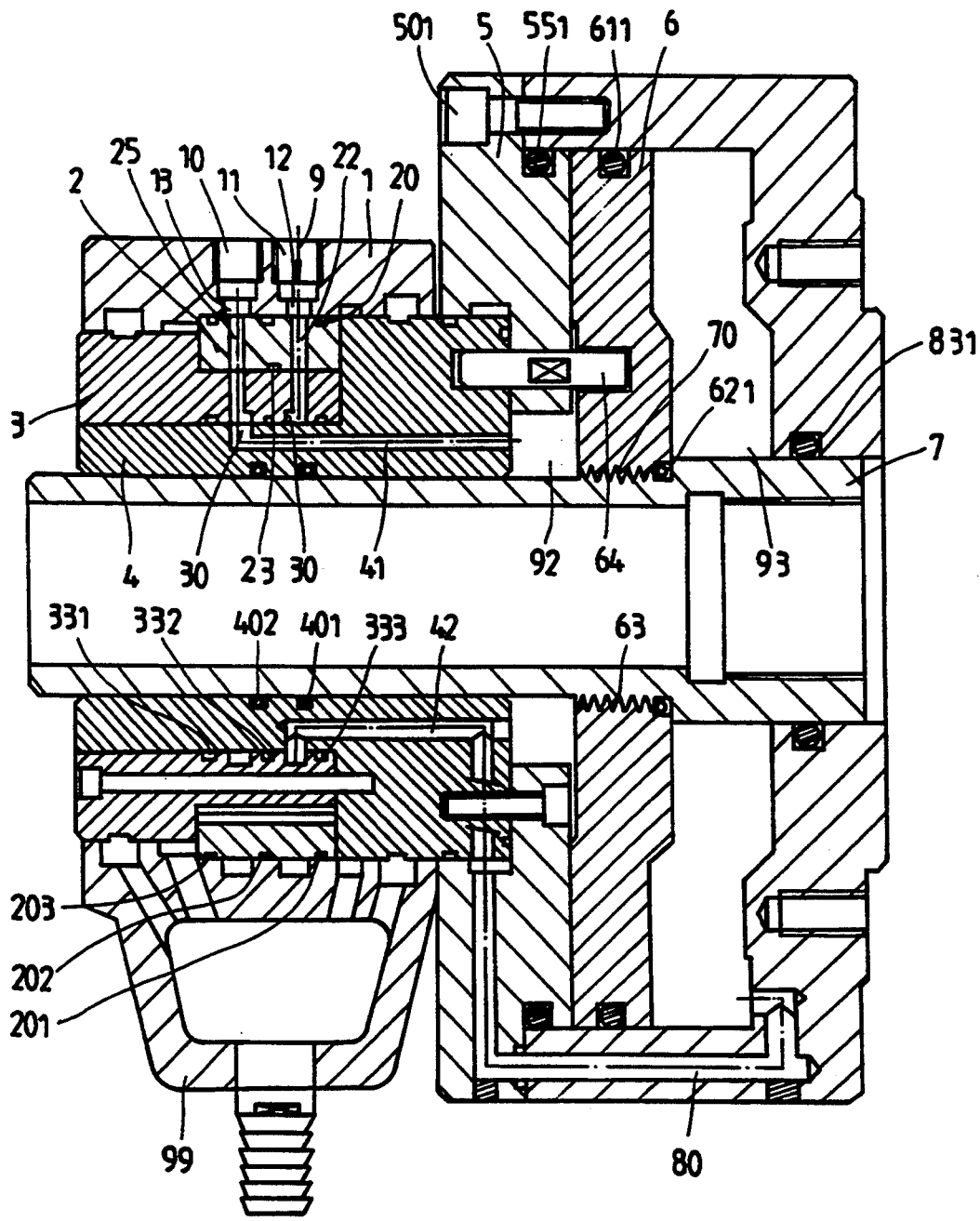
FIG. 6A and 6B are sectional plan views showing the action of the slide ring of another embodiment according to FIG. 5; and, FIG. 7 is a sectional plain showing the application of the present invention in driving a chuck.
Figure 6B:
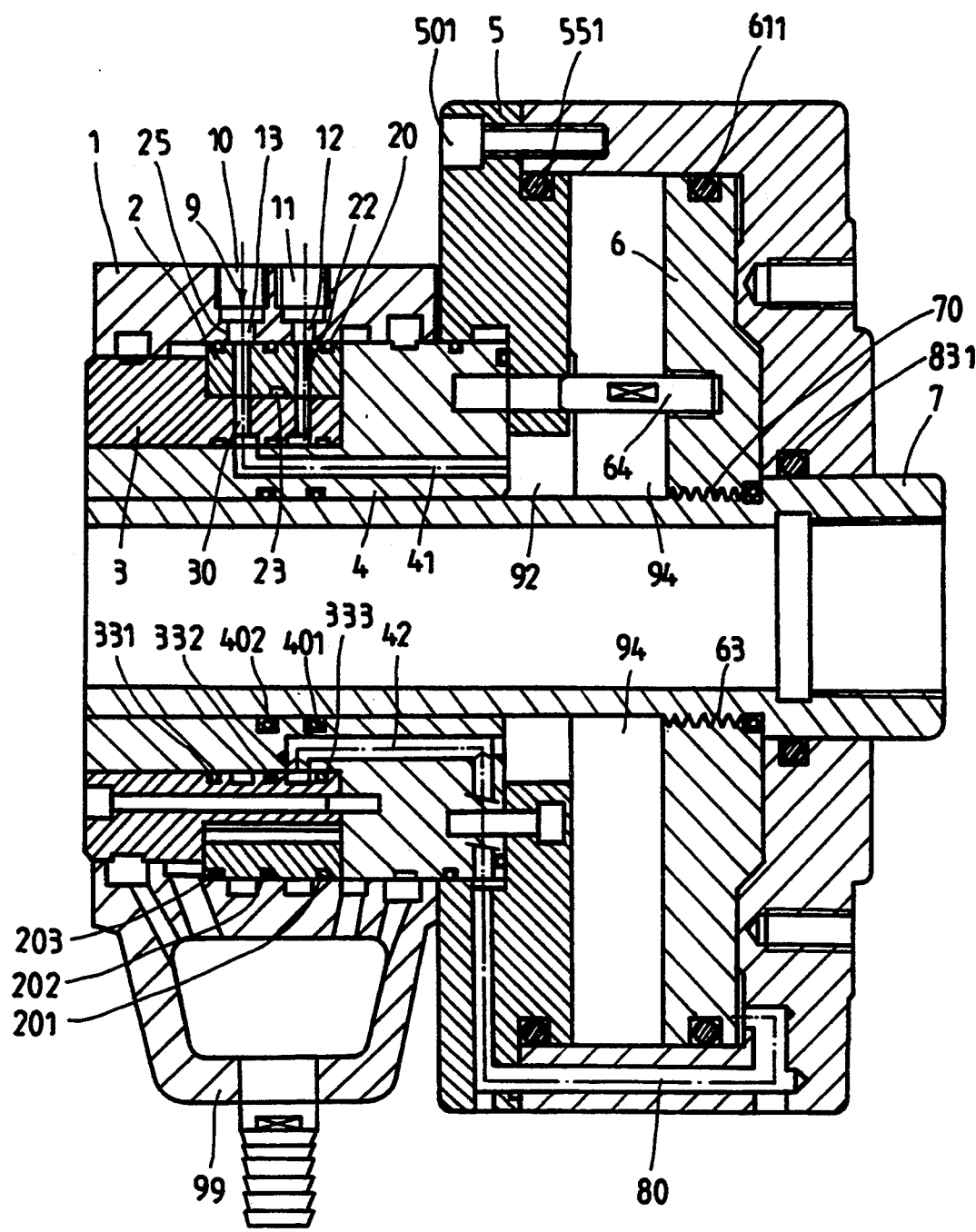
Figure 7:
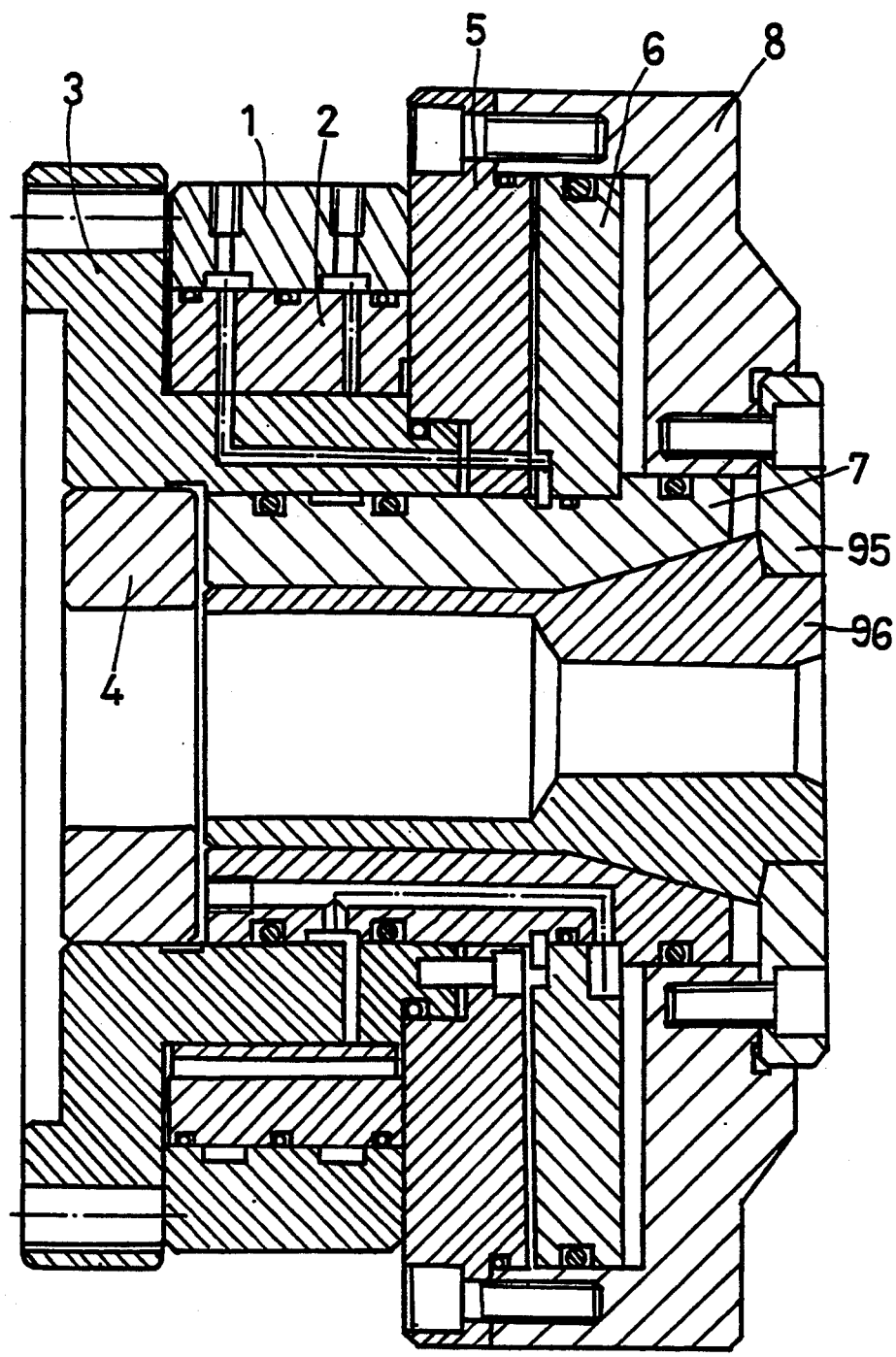

Referring to FIGS. 5, 6A, 6B and 7, the rotary transmission mechanism of the present invention may be used in a rotary hydraulic cylinder (see FIGS. 5 and 6A, 6B) or a quick chuck (see FIG. 7). For use in a rotary hydraulic cylinder, as illustrated in FIGS. 5 and 6A, 6B, a fluid collector 99 shall be made on the cylindrical mount 1 to collect residual hydraulic fluid 9'. The operation process of this alternate form is similar to the aforesaid first embodiment. For use in a quick chuck, as illustrated in FIG. 7, the inner diameter of the spindle 7 is made equal to the outer diameter of the quick chuck 96 to be driven, the stop block 95 is fastened to the front packing member 8 by screws to limit the forward movement of the quick chuck 96, the cylindrical mount 1 is mounted on the base of a machine, and the stepped inner socket 3 is connected to the power unit.

Referring to FIGS. 2 through 7 again, the number of the guide holes 22 on the intermediate ring 2 and the inlet holes 30 on the stepped inner socket 3 may be changed in direct proportion according to the size of the rotary cylinder.

What is claimed is:

1. A rotary transmission mechanism comprising:
   a cylindrical mount having two inside annular flow guide grooves spaced around the inside wall, two air holes with a respective pipe connector for guiding a flow of compressed air or hydraulic fluid to the inside annular flow guide grooves;
   an intermediate ring inserted in said cylindrical mount, the intermediate ring having three outside annular grooves spaced around the outside wall and respective mounted with a respective seal ring, two series of guide holes respectively disposed in communication with the inside annular flow guide grooves on said cylindrical mount, an inside annular flow guide groove around the inside wall, and an even number of equiangularly spaced, longitudinal through holes intersected with the inside annular flow guide groove;
   a stepped inner socket inserted into said intermediate ring inside said cylindrical mount, the stepped inner socket having two symmetrical series of inlet holes in radial direction, a plurality of equiangularly spaced, longitudinal pin holes, into which a screw bolt each is respectively inserted, three inside annular grooves around the inside wall respectively mounted with a respective seal ring, two annular flow guide grooves spaced between either two of the three inside annular grooves and respectively disposed communication with either series of the inlet holes;
   a flow guide made from a headed tube inserted in said stepped inner socket, the flow guide having two inside annular grooves around the inside wall respective mounted with a respective seal ring, two opposite flow guide holes through its head, two outside annular grooves on its head respective mounted with a respective seal ring, and a plurality of screw holes spaced through its head in longitudinal direction;
   a rear packing member covered on said flow guide over said cylindrical mount at one end, the rear packing member having a plurality of screw holes respectively connected to the pin holes on said stepped inner socket and the screw holes on said flow guide, an annular flow guide groove on the inside, a flow guide hole extended from the annular flow guide groove to the outside, and an outside annular groove around a peripheral wall thereof mounted with a seal ring;
   a front packing member made in the shape of a cap fastened to said rear packing member by screws with a holding space defined therebetween, the front packing member having a flow guide hole in communication with the flow guide holes on said flow guide, an inside annular groove on a center through hole thereof mounted with a seal ring;
   a slide ring movably disposed inside the holding space within said front and rear packing members, the slide ring having a plurality of bolt equiangularly spaced on one side and respectively and movably inserted through holes on said rear packing member into holes on said guide member, an outside annular groove mounted with a seal ring stopped against said front packing member, and a center through hole with an inner thread;
   a spindle inserted through said front packing member, said slide ring, said rear packing member, said flow guide, said stepped inner socket, said intermediate ring and said cylindrical mount, the spindle having an outer thread threaded into the inner thread on said slide ring, an outside annular groove mounted with a seal ring stopped against the inside wall of the center hole of said slide ring, a center through hole through its length, and an inner thread on one end of the center through hole; and
   whereby compressing a flow of compressed through either inlet hole on said cylindrical mount causes said slide ring to be moved forwards or backwards and simultaneously causes said spindle, said flow guide, said stepped inner socket, and said rear and front packing members to be floated concentrically without producing any friction resistance.

* * * * *